United States Patent [19]
Cason et al.

[11] 4,425,629
[45] Jan. 10, 1984

[54] DISPLAY SUPPORT OF INDEFINITE PAGE

[75] Inventors: William C. Cason, Austin; Ward A. Kuecker, Round Rock, both of Tex.

[73] Assignee: International Business Machines Corporation, Armonk, N.Y.

[21] Appl. No.: 274,048

[22] Filed: Jun. 16, 1981

[51] Int. Cl.[3] .............................................. G06F 3/14
[52] U.S. Cl. .................................................... 364/900
[58] Field of Search ... 364/200 MS File, 900 MS File

[56] References Cited
U.S. PATENT DOCUMENTS

| | | | |
|---|---|---|---|
| 3,958,225 | 5/1976 | Turner et al. | 364/900 |
| 4,069,511 | 1/1978 | Lelke | 364/200 |
| 4,078,249 | 3/1978 | Lelke et al. | 364/200 |
| 4,094,000 | 6/1978 | Brudevold | 364/900 |
| 4,125,868 | 11/1978 | Hruby et al. | 364/900 |
| 4,189,727 | 2/1980 | Vaughn, Jr. | 340/711 |
| 4,198,685 | 4/1980 | Corwin et al. | 364/900 |
| 4,223,393 | 9/1980 | Abe et al. | 364/900 |
| 4,244,031 | 1/1981 | Izushima et al. | 364/900 |

Primary Examiner—Jerry Smith
Assistant Examiner—Mark P. Watson
Attorney, Agent, or Firm—Andrea P. Bryant

[57] ABSTRACT

A text processing system includes a first external storage area for text documents, an internal text storage buffer where, inter alia, edit operations are performed, and a third storage area in which text is formatted for display. The area for formatting text for display is related to the internal text storage buffer by a table containing pointers to the text storage area, one for each line to be displayed. The pointers are expressed relative to a single known address, that of the start of the line in the text storage buffer containing the point at which the edit operation is to occur.

11 Claims, 14 Drawing Figures

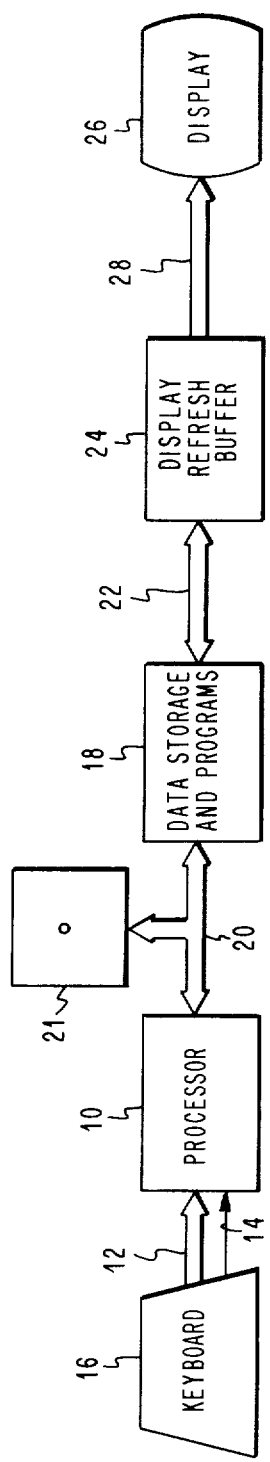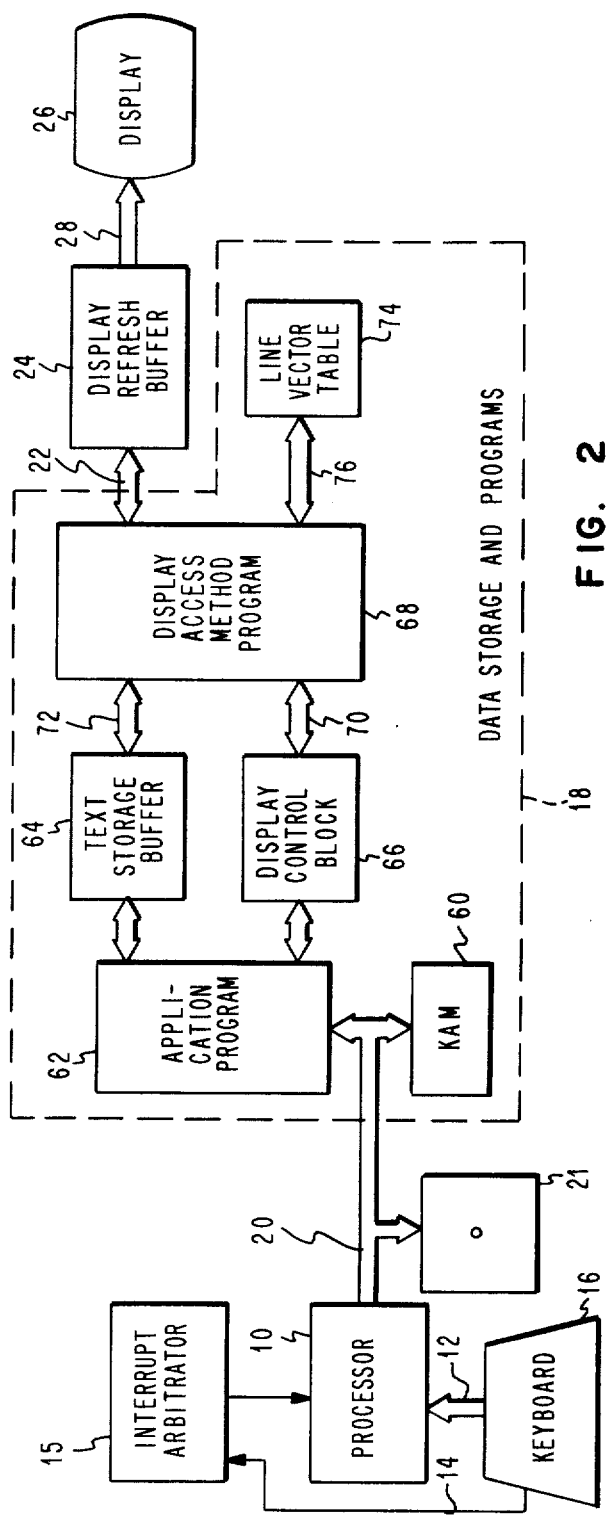

DISPLAY SUPPORT OF INDEFINITE PAGE

DESCRIPTION

Technical Field

This invention relates to interactive text processing. In particular it relates to dynamically displaying documents of indeterminate length, the entirety of which cannot fit at once either into the display storage area or onto the display screen.

Background Art

In text processing systems data keyed in and stored is recalled from the storage medium and placed in a particular storage area which may be referred to as a text storage buffer to facilitate editing operations, that is, revisions, additions, deletions, to previously keyed data. To optimize the operator interface to the text processing system, access time to the previously keyed text and a response time to any editing changes thereto should be minimized.

Office machines for processing text data to produce hard copies utilize display screens for presenting to an operator visual text as it would appear on hard copy. Typically, such machines incorporate a conventional typewriter keyboard with additional control keys for operator interface with the system controls. The operator keystrokes are displayed on a screen quite similar to a home television receiver screen. This screen either displays a full page of text (an amount of text corresponding to a printed page), a partial page, or in some machines only a single line of text. The display not only provides a visual presentation to the operator of the text being prepared but also provides prompting instructions for the operator of how to interface with the machine.

Responding to the keyboard strokes of an operator are system controls including programmed computers which prepare the text display. Most present day text processing systems include electronics hardware programmed to evaluate the operator keystrokes and to control the display. This electronics hardware includes memory for storing character data and instruction data for future use in editing and the preparation of hard copy. Ease of operation of the machine for the operator is in large part determined by the electronics and the associated computers and programs therefor.

Heretofore, text processing systems have worked with finite pages. That is, text was developed and stored in segments equivalent in length to the final desired printed page size so that the buffer or storage area in which editing is performed was required to also be the same size as the page. This restriction proved unacceptable because of limitations resulting from a finite page size.

Having a finite page size restricted the choice of size for a random access memory (RAM). Two problems in particular resulted. First: In a high productivity environment it is desired that the operator of a text processing system key entire documents without regard to pagination decisions, thus, the requirement for an indefinite page. The second problem relates to RAM size choice. Regardless how large a RAM is chosen there are still "typical" applications which would require more storage space for a "page". Cost considerations also discourage choice of this route.

Another prior art technique employed involved a complete exchange of data from the editing storage area, or as referred to in the present invention, the text storage buffer and the main system storage medium. This, too, proves costly from a system performance perspective.

DISCLOSURE OF THE INVENTION

The present invention offers advantages which overcome the aforementioned prior art limitations. In a text processing system including a keyboard, display, and random as well as direct storage means, documents are created and stored in segments comprising a "page" of indefinite length on the direct storage device. A text storage buffer, TSB, is provided in which, inter alia, edit operations are performed, at any point in time, on only a multisegment subset of the total document. The TSB may be visualized as a "window" by which the indefinite page of a document passes in accordance with the system operator's option. At the operator's will, text data is scrolled vertically and horizontally on the screen which is an additional "window" placed upon the TSB.

The system in which the present invention is embodied includes another storage area equivalent in size to the display screen, in which area text data from the TSB is formatted for presentation to the display device. The above described storage area is usually referred to as a screen or display refresh buffer.

The present invention allows display of text, the location of which may change with time, without adverse affects on operator perceived response time, because the present invention provides a means for keeping the display screen current without a requirement of reconstructing the display.

The TSB for the present invention, in addition to having the ability for text to circulate between itself and the direct storage device, also is provided with a blank area or "bubble" at the edit point which corresponds to the cursor perceived by the operator on the screen of the display device. The operator perceived cursor at the edit point is hereinafter called CCA for contextual cursor address. This address is in the TSB. The bubble at the CCA is an advantageous feature which improves system performance by eliminating the need for massive memory manipulation for any given edit step.

A scrolling operation and/or bubble size or location change, hereinafter collectively referred to as a TSB "float", increase the need for efficient means within the system to correlate to some easily maintainable point of reference where a piece of text is.

It is necessary to correlate where a piece of text is currently because the location of a text entity is dynamic within the TSB. A given text entity moves for two reasons, one, because of the bubble, the size and location of which can be changed, and two, because of vertical scrolling which moves segments into and out of the TSB. The system in which the present invention is embodied includes a table called the line vector table (LVT) which contains one entry for each line to be displayed. Each LVT entry contains format information, called a point format, such as character set, etc. Each entry also includes a pointer to the TSB location of the text to be displayed. This table is initialized during an operation called "BUILD" during which the entire screen is formatted. The validity of these pointers disappears when the contents of the TSB shifts.

Generating and maintaining complex tables of pointers and the like to correlate TSB text locations with the LVT pointers would cause an increase in RAM requirement and in the time required to update the display. The present invention provides a technique by which all LVT pointers are made relative to a single address, which, while movable in fact, is always provided when control is given to the display routine in which the present invention is embodied. This fixed reference point is the starting address in the TSB of the line containing the CCA or edit point. This point is hereinafter referred to as CLA for cursored line address. This address, assigned a displacement value of zero, serves as the base. All other LVT pointers are expressed relative thereto.

The foregoing and other features and advantages will become apparent from the more particular description of the preferred embodiment of the invention is illustrated in the accompanying drawings.

BRIEF DESCRIPTION OF THE DRAWING

FIG. 1 is a basic block diagram of a text processing system including a keyboard, processor, memory storage and a display screen for visual presentation to an operator of text and operating instructions.

FIG. 2 is a detail showing the contents of memory 18 of FIG. 1 as structured for displaying pages of indefinite length.

FIG. 8 reflects the corresponding locations of the edit point in the screen, TSB, and diskette.

FIG. 9 reflects the state of the screen, TSB, and diskette before a MOVE.

FIG. 10 reflects the intermediate effect of the MOVE on the screen and TSB.

FIG. 11 reflects the final state of the TSB after the MOVE.

FIG. 12 reflects the corresponding location of a new edit point in the screen, TSB, and diskette of FIGS. 8-11.

FIG. 13 reflects the corresponding screen, TSB, and diskette text locations after vertical scroll in the TSB.

FIG. 14 reflects the final result of the edit point MOVE of FIGS. 12 and 13.

DETAILED DESCRIPTION

Figure 3:
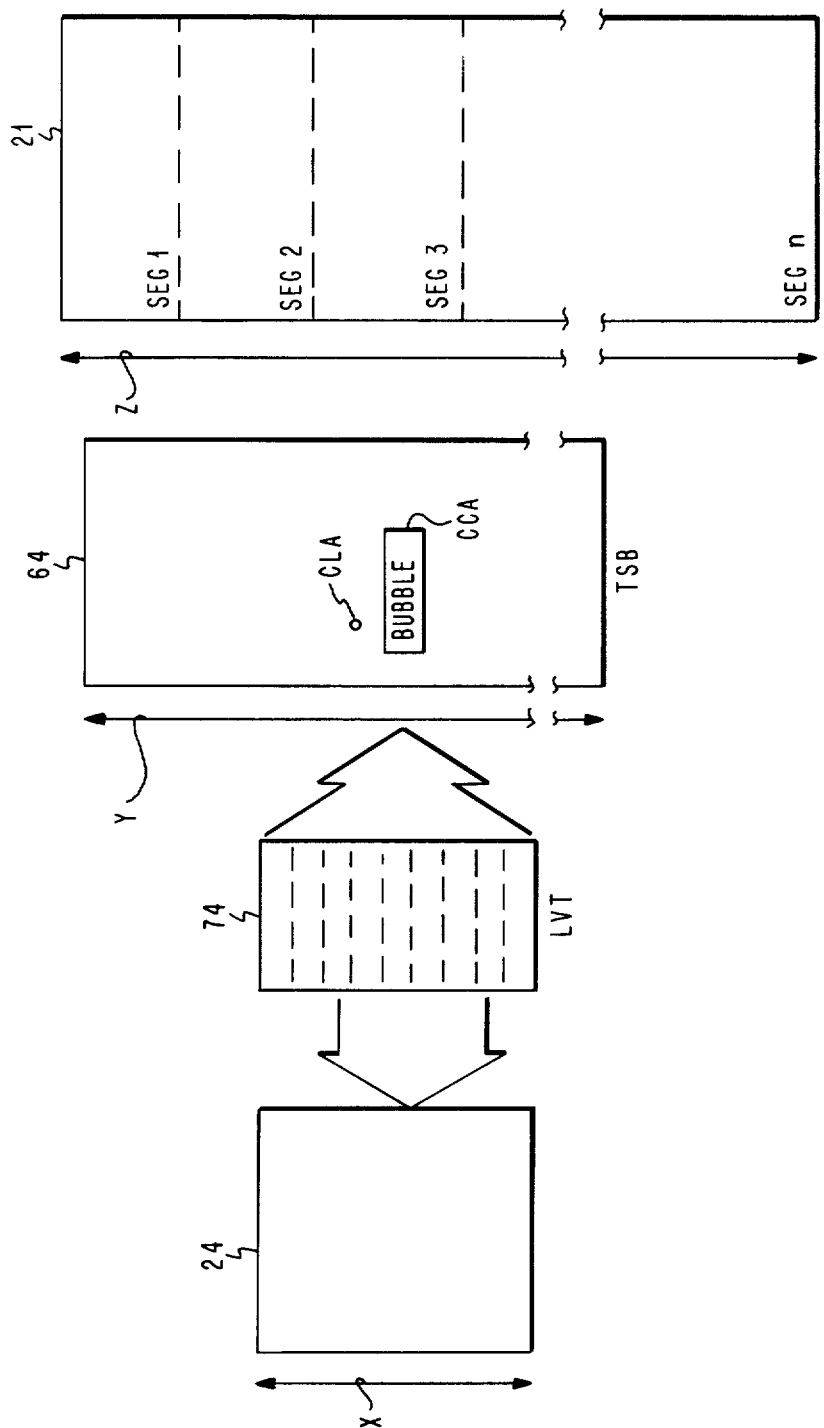
FIG. 3 is a schematic illustration of relative text capacity of components of the text processing system of FIGS. 1 and 2 and their relationship to the LVT.

Referring to FIG. 1, a text processing system is shown including a processor 10, interconnected by means of a data bus 12 and control lines 14 to a keyboard 16. Included on the keyboard are conventional alphanumeric characters found on the standard typewriter keyboard. In addition, the keyboard includes symbol keys, such as backspace, carrier return and tab settings along with function keys used to instruct the system to perform certain operations, to control the way a display is created, or to provide information about stored textual data. In addition, the keyboard includes code keys that are used in conjunction with another key to input special instructions to the processor 10.

Keystroke data transferred to the processor 10 over the data bus 12 in the form of 7-bit bytes is processed by instructions stored in a RAM 18 by means of an interconnecting data bus 20. The RAM 18 stores the keystroke data bytes in addition to instructions for operation of the processor 10.

The text processing system shown includes flexible diskette storage means 21 connected via data bus 20 to processor 10 and RAM 18 to provide additional data and program storage capacity.

Also connected to the RAM 18 by means of a data bus 22 is a display refresh buffer 24 that receives display data for formatting a visual presentation on a display screen 26. Control signals for operation of the display screen 26 are provided along a data bus 28.

Typically, the display screen 26 is a cathode ray tube, and in a preferred embodiment of the present invention, is formatted into four virtual images, on the major one of which are displayed twenty lines of text information. The total line capacity of the display is twenty-five lines with the first two lines reserved as a virtual display for document formatting information and the bottom two lines of the display reserved for virtual images as a prompt line and a message line to give an operator instructions on the control of the text processing system of FIG. 1.

Referring to FIG. 2 there is shown one operational format of the RAM 18 of FIG. 1. In FIG. 2 the keyboard 16 is shown with the data bus 12 connected directly to the processor 10 while the control bus 14 is connected through an interrupt arbitrator 15 to the processor. The interrupt arbitrator 15 is logic hardware that receives all system interrupts and processes them on a priority basis for purposes of describing the present invention, only the keystroke interrupt will be considered.

As formatted, the RAM 18 includes a keystroke access method (KAM) 60 made up from defined storage locations. It should be understood that each of the identifiable areas of storage in the RAM 18 comprise storage locations addressable by conventional techniques. Thus, the keystroke access method 60 receives keystroke data bytes over the data bus 20 which is also connected to an application program memory 62. Stored in the application program memory 62 are application programs consisting of instructions and data bytes transferred between the application program memory 62 and the TSB 64 or a display control block memory 66. As the name implies, the TSB 64 contains a data stream of unformatted text. Each byte in this data stream is either a graphic item (letters, numbers, etc.) of single byte length, a single byte control instruction (a line end, tab stop, carriage return, etc.) or a multi-byte control code. A multi-byte control code is a string of data "N" bytes long that contains information on how to format the data stream in the text storage buffer. Typical of multi-byte control codes are "left" and "right" margin settings, tab stops, character pitch, etc. Thus, the TSB 64 is that area of the RAM 18 that contains the data stream, part or all of which is to be formatted on the display screen 26.

That area of the memory 18 identified as the display control block 66 receives data and instructions from the applications program memory area 62 to generate formatting instructions to a display access method (DAM) program 68. These formatting instructions are passed between the display control block and the DAM program 68 by means of an instruction bus 70.

Also received by the display access method program 68 are graphic bytes and control bytes from the TSB 64 on a data bus 72.

In response to instructions from the display control block 66, the DAM program 68 formats the data from the text storage buffer 64 for inputting to the display refresh buffer 24 over the data bus 22. Also required for formatting of a display by the DAM program 68 is display information stored in LVT 74 which data is transferred between the DAM program 68 and the storage 74 by means of a data bus 76. The LVT 74 has an entry for each line of display on display screen 26. The LVT entries include a pointer to the TSB 64 location of the data to be displayed in the corresponding line of display 26. Other information referred to collectively as point formats comprise the remainder of the entry for each line in the LVT. Point formats include items such as indent level, tab rack address, and similar information required by DAM 68 to format the screen on the display device 26 via the refresh buffer 24. The DAM interfaces with the LVT to construct and update a display.

By operation of the random access memory 18 in conjunction with the processor 10, in the manner to be described with reference to other figures, a presentation of text is made on the display screen 26 that includes a cursor at a location defined by operator keystrokes.

Typically, the random access memory 18 contains instructions and data stored therein at various address locations. Instructions are loaded into the RAM 18 for formatting the address locations to perform the function identified to the system. Alternatively, the random access memory may be replaced entirely by a combination of hard wired logic which would also replace the processor 10 such that "instructions" and the processor are not utilized. The flow diagrams described hereinafter will enable any person having skill in the art of logic design to specify hardware logic in accordance with the concepts of the claimed invention. These flow diagrams will also enable anyone having skill in the art of computer programming to program a general purpose digital computer to perform the functions described.

Refer now to FIG. 3 which represents schematically the relative capacities of the several text storage location in the system. Only a limited number of text lines will be displayed whereas the total number of text lines may often exceed this number. Further, there is more data stored in the TSB 64 than may be displayed in either dimension on the display screen 26.

Shown in FIG. 3 at the far right is a representation of the diskette or other external storage means 21 (FIGS. 1 and 2). It can be seen that the storage area is divided into segments shown as SEG1 through SEGn. Segments are of varying lengths. The total capacity of storage means 21 is represented by the letter Z. Moving to the left in FIG. 3 TSB 64 from FIG. 2 is represented. The length of TSB 64 is variable as a function of the application program in the text processing system which creates it. Its total length however is represented by the letter Y. The display refresh buffer from FIG. 2 at 24 is represented. Display refresh buffer 24 has a capacity equal to that of the display screen 26. That is, there is a one to one correspondence between line locations in the display refresh buffer and the display screen. The total capacity of refresh buffer 24 and screen 26 is indicated by the letter X. The problem solved by the present invention arises when the relationship is such that X is less than Y which is less than Z.

Also represented in FIG. 3 is the LVT 74 (FIG. 2) and its relationship to the TSB 64 and display refresh buffer 24. There is an entry in LVT 74 for each displayable line whose contents are actually formatted in the refresh buffer 24. Three concepts important to an understanding of the present invention are also indicated in TSB 64. It will be recalled that CCA represents the point at which the system operator desires to perform an edit operation. CLA is the address of the line containing the edit point. BUBBLE is the blank area provided at the edit point.

Before continuing the discussion of the system embodying our invention refer again to FIG. 2 for an overview of what is to follow in greater detail. The application program 62 calls DAM to change the display image. When complete, DAM returns control to the application program. During the time period when the display image is undergoing change under the control of DAM, no changes are made to the TSB. This is a synchronous operation.

DAM is first called to BUILD a new display image when a document is first read into the TSB from the diskette 21. While BUILDING a new display image, DAM sets up the LVT pointers. After the initial BUILD, DAM is called when it is, as a function of operator keystrokes, desired to UPDATE a portion of the display or MOVE to a new edit point. During each such operation DAM maintains the currency of the pointers in the LVT. For every call the application program 62 passes to DAM:

1. The starting address of the TSB (TSBS);
2. Length of the TSB (TSBL);
3. Bubble start address (BBS) relative to TSBS;
4. Bubble length (BBL).

For every BUILD and UPDATE call the application program passes a contextual cursor address (CCA) to DAM. Each time it is called DAM saves the old bubble length (OBL) in its private memory area and returns to the application program the cursored line starting address (CLA) relative to the TSBS. Each time DAM is called to MOVE or UPDATE, the application program passes the previous CLA to DAM expressed relative to TSBS. It is the responsibility of the application program to adjust CLA if its position has changed in the TSB.

Some examples of events which cause the change of position of the CLA in the TSB are scrolling of segments as a result of reaching the boundary of the TSB and moving the cursor which moves not only the CLA but also may cause the bubble to shift dramatically.

DAM maintains the information concerning text displayed on the screen in the LVT 74. DAM obtains the information during a scan of the TSB during BUILD, MOVE or UPDATE operations. This information is used in subsequent MOVE and UPDATE operations so that DAM need not start at the beginning of the TSB to find data needed to format text. As will become clear as the discussion and description proceeds, DAM iterates through its routines to convert to pointers relative to the cursored line address in the TSB.

All addresses saved by DAM are current while DAM changes the display image as a result of the synchronism requirement. Returning to the application program enables operator keystroke action which may change those pointers in the TSB. On the next subsequent MOVE or UPDATE call the saved addresses in LVT 74 may not have any meaning. DAM places a requirement on the application programs 62 to allow this text line format to be correlated to an absolute text location. This requirement is that one and only one absolute pointer be maintained between DAM and the application program. That one pointer is the cursored line address. All other text addresses are maintained by DAM in the LVT relative to the cursored line address. Just prior to the return of control from DAM to an application program, DAM converts all saved addresses to be expressed relative to CLA.

Figure 4:
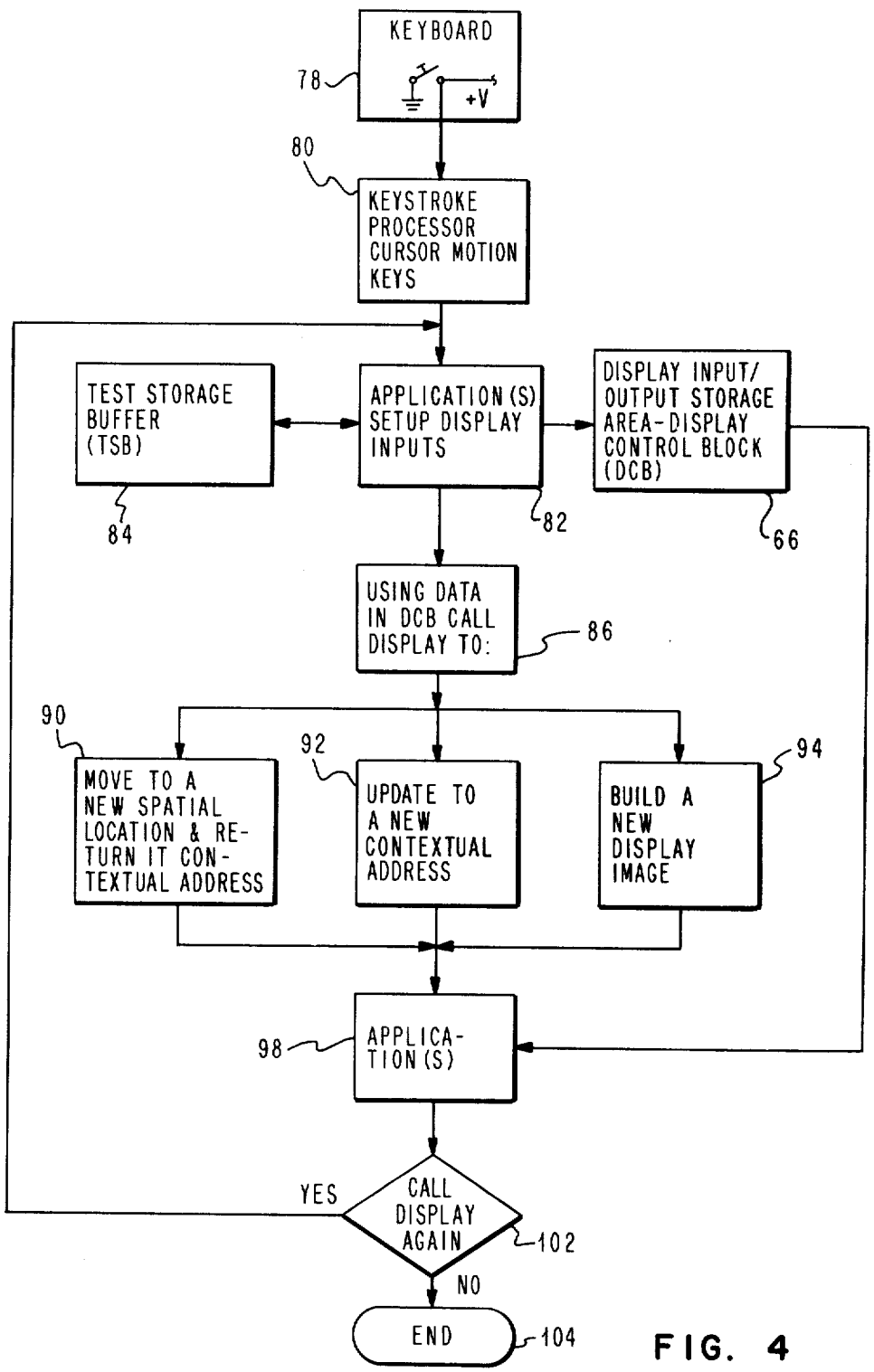
FIG. 4 illustrates parts of the operation of processor 10 of FIG. 1 during an editing operation.

Refer now to FIG. 4, a flow chart of the just previewed operation of the DAM program 68 for displaying text on the display screen 26. An operator inputs a keystroke data at 78 to establish a cursor position in either the vertical or horizontal position displaced from the present cursor position on the display screen 26. This cursor keystroke is processed into a spatial cursor position to identify a new cursor spatial location on the display screen 26. The keystroke is processed in the processor 10 at 80 and input into the keystroke access method 60. An application set-up is selected at 82 which for purposes of the description of the present invention will be defined as a text application. The various application programs are called by a command from the applications program 62 in response to an interrupt. Other application programs for display include a "menu" application, multiple virtual image displays, and a diagnosis application. An application program 62 calls the DAM program 68. The DAM program 68 retrieves instructions from the display control block 66 and for a text display looks to the text storage buffer at sequence 84 to provide graphic and control data bytes.

After retrieving data from the TSB 64, the DAM 68 receives data from the display control block 66 and calls one of several subroutines by a call from control block 86. One subroutine 90 that is available to be called is identified is a "MOVE" and during the running of this subroutine the DAM program 68 converts a spatial location, relative to a current spatial cursor position, to its contextually equivalent location. This subroutine is called to resolve a contextual pointer position and receives a spatial location as an input and outputs the corresponding contextual location. Still another possible subroutine called by the DAM program 68 at control block 86 is identified as an "UPDATE" subroutine 92. This subroutine provides instructions for operation of the display access method program 68 to update the textual display starting with the line on which the cursor presently appears on the display screen 26. During this subroutine the display access method program 68 reformats the identified line and performs horizontal or vertical segmentation as required.

The primary subroutine that is called by the control block at 86 is used not only for cursor movement but for other applications of the text processing system and is identified as a "BUILD" subroutine 94. The BUILD subroutine provides data and instructions to format the display using the unformatted data from the text storage buffer 64. This subroutine is run to return the display screen 26 to a prior state, for example, following the return from a menu display; initially format text, for example, entry by an operator to revise text on a page; or to format text which has been changed, for example, following a "boundary" key. Primarily the BUILD subroutine is run when the text from the text storage buffer 64 has changed such that the prior image is obsolete. Input to the BUILD subroutine for cursor motion is the contextual cursor with an output representing the corresponding spatial location. It should be noted that during the BUILD operation, DAM 68 initializes the LVT 74.

Following the return of any of the subroutines 90, 92, or 94 to the routine of FIG. 4 an application check 98 is made on the output data in the display control block, as represented by the block 66, to again run the DAM program 68. The program call may be for one of the discussed subroutines for cursor motion, or another operation of the text processing system. A text is made at 102 to determine if the display program is to be called again by the application set-up 82, or if the program is to step to an end at 104.

Figure 5:
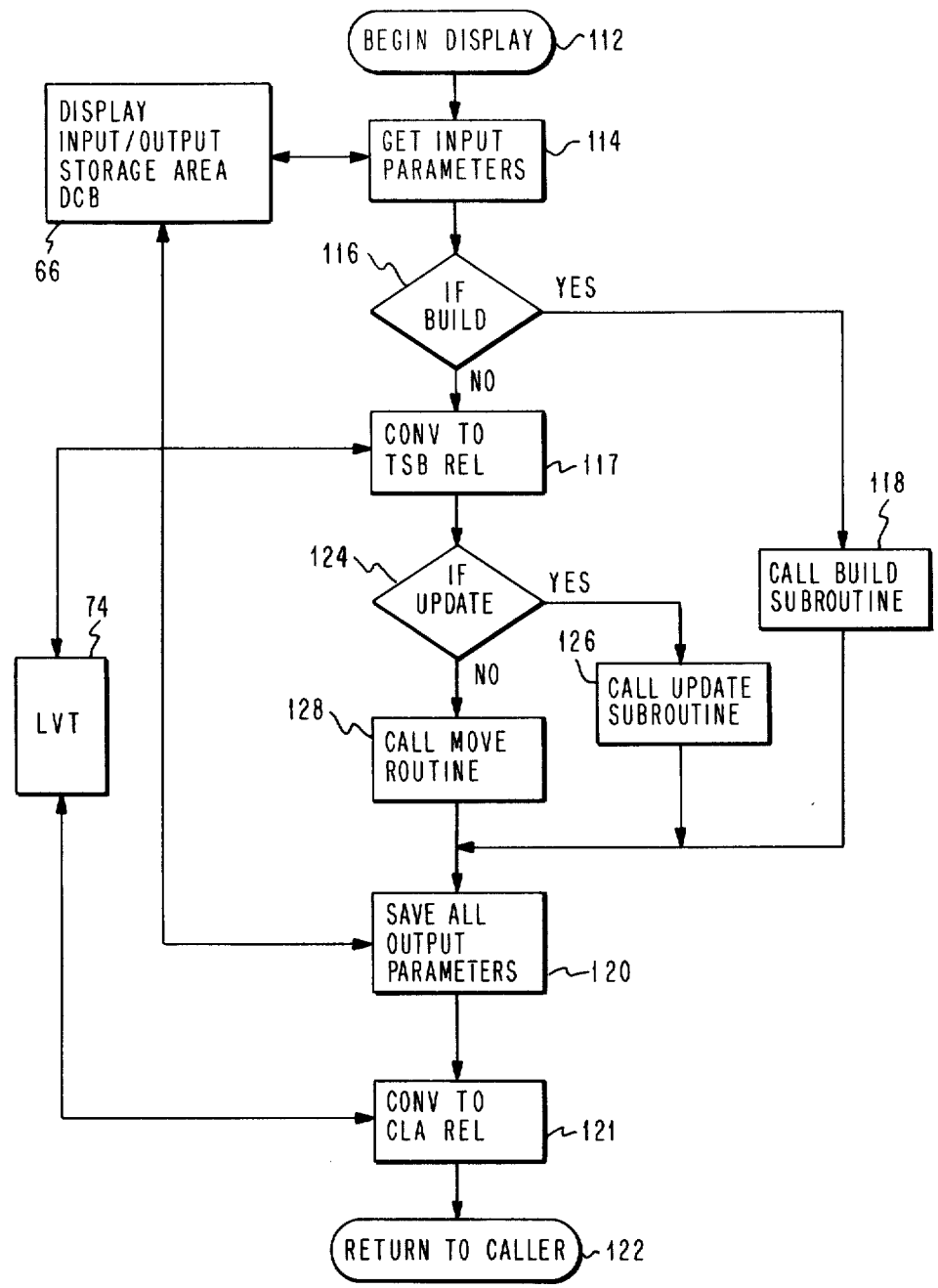
FIG. 5 is a flow chart illustrating steps followed by DAM during display operations.

Referring now to FIG. 5, when an applications interrupt occurs as the result of a keystroke the DAM program 68 is called and runs the illustrated routine which is called at 112 from the control block 86. Initially input parameters are obtained at 114 from the display input-/output storage area of the display control block 66 and test 116 is made to determine if the build flag has been set. When the control block 86 calls the "BUILD" display subroutine then it is called at 118. Upon completion of the BUILD subroutine all output parameters are saved at 120. The output parameters are transferred to the display input and output storage area 66. DAM then converts saved addresses in LVT 74 to be relative to CLA at step 121 which conversion will be explained in more detail with respect to FIG. 7. The display routine returns to the caller at 122.

If the BUILD subroutine is not identified as being called at test 116, then at step 117 DAM converts the CLA relative address to be relative to TSBS. More details of this conversion will be explained in connection with FIG. 6. The DAM performs test 124 to determine if the control block 86 is calling for a display update which calls the UPDATE subroutine at 126. Upon completion of the UPDATE subroutine, all the output parameters are saved at sequence 120 in the display input and output storage area 66. It should also be noted that required corrections to LVT entries are also made at this time in the UPDATE routine. The saved addresses in LVT 74 are converted to CLA relative expression at step 121. The DAM program 68 returns operation of the memory 18 to the applications program 62.

If the UPDATE subroutine is not to be called at sequence 124, then the routine of FIG. 5 calls the MOVE subroutine at sequence 128 and upon completion of this subroutine output parameters are saved at sequence 120 in the display input and output storage area 66. It should also be noted that required corrections to LVT entries are also made at this time in the MOVE routine. Again, after DAM converts the saved addresses in LVT 74 to CLA relative, control of the memory 18 returns to the applications program 62.

Figure 6:
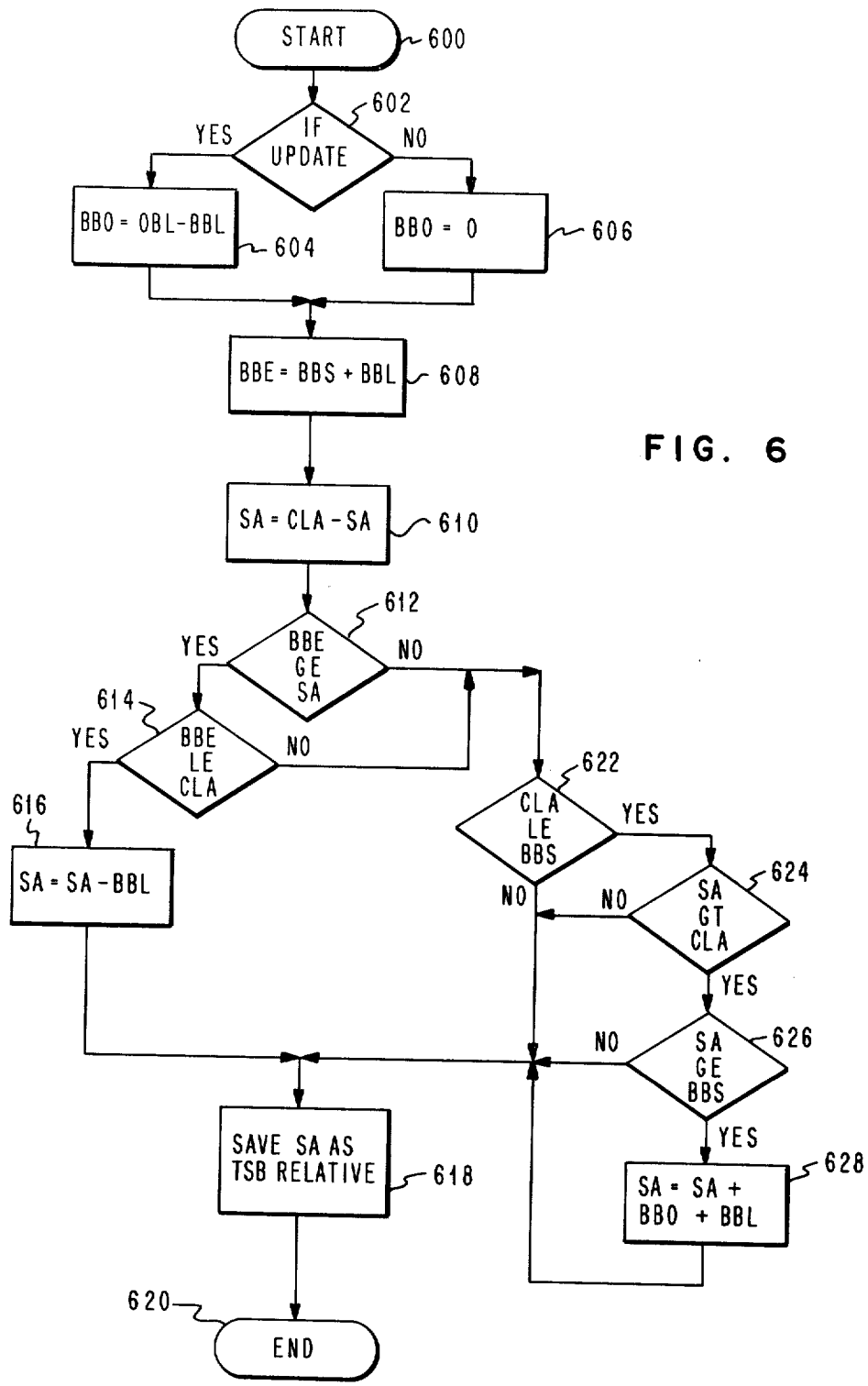
FIG. 6 shows steps performed by DAM in expressing text location addresses in terms relative to TSB start.

Refer now to FIG. 6 which reflects in more detail the function represented at step 117 in FIG. 5, performed by DAM on subsequent screen UPDATE and MOVE calls. Terminal point 600 represents DAM's assumption of control. The first determination at 602 made by DAM as to whether this is an UPDATE operation. If it is, as shown at 604, DAM sets the bubble offset (BBO) equal to the difference between the old bubble length and the current bubble length. If the test done at 602 indicated that it was not an UPDATE operation, then at step 606 DAM sets the bubble offset (BBO) to zero. Once a new value has been assigned to bubble offset then at step 608 DAM sets the bubble end address (BBE) equal the bubble start (BBS) address plus the bubble length. Step 610 represents the subtraction by DAM of the saved address (SA) from cursored line address (CLA). The rest of the steps are used to factor out the bubble from the now TSBs relative SA. Determination step 612 is used by DAM to decide whether the bubble end (BBE) address is greater than the SA. If it is, DAM determines at step 614 whether BBE is less than or equal to the CLA. If so, DAM performs subtraction 616 to subtract the bubble length from the saved address. At save operation 618, DAM places the now TSB relative save address in its private storage area and returns control at 620 to the calling application program. Returning to decision steps 612 and 614, if BBE is neither greater than nor equal to SA, or less than or equal to the cursored line address then determination process 622 decides whether the cursored line address is less than or equal to the bubble start address. If it is not, then DAM saves the address at step 618 and returns control at terminal 620. If, however, the cursored line address occurs in the TSB prior to or just at the start of the bubble DAM decides at step 624 whether the saved address occurs after the cursored line address. If it does not, then steps 618 and 620 are taken. If, however, the saved address occurs after the cursored line, then at test 626 DAM determines whether the saved address is greater to or equal to the bubble start address. If not, then the save and return steps 618 and 620 are taken. If the saved address does coincide with or come after the bubble start address, then DAM adds at step 628, the bubble offset and bubble length to the saved address and follows with save and return steps 618 and 620.

Figure 7:
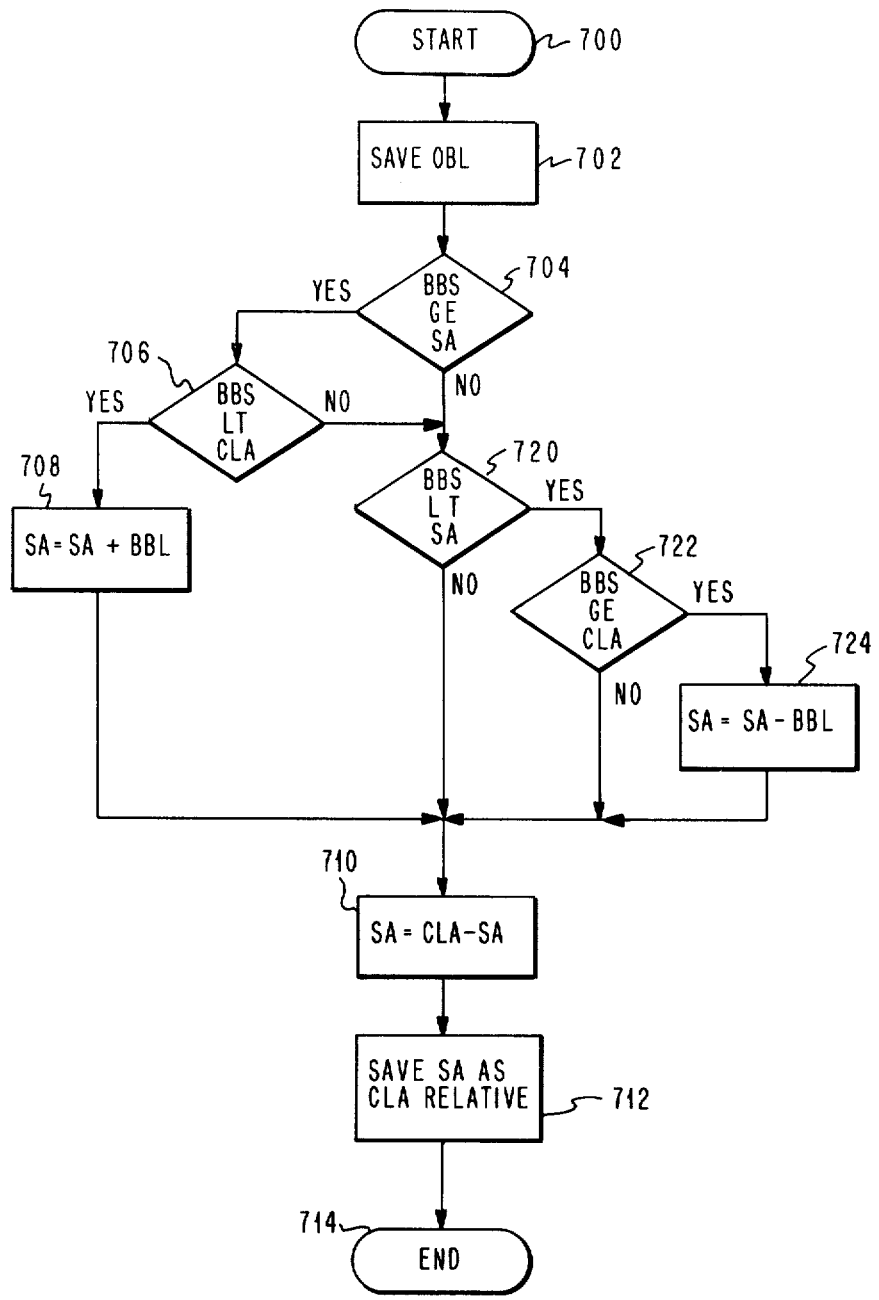
FIG. 7 represents the steps performed in DAM to express text location addresses in terms relative to CLA.

Referring now to FIG. 7, there is shown an expansion of step 121 in FIG. 5. FIG. 7 is a flow diagram of the steps taken by DAM relating to converting addresses to be expressed relative to the CLA before control is returned by DAM. DAM first factors out the effect of the bubble on the address before determining its displacement from the CLA. Terminal point 700 indicates when control is assumed by DAM. The first step as shown at 702 is to save the bubble length in the area private storage known as OBL. Step 704 represents the determination by DAM whether bubble start address (BBS) is greater than the saved address (SA). If so, DAM determines at 706 whether the bubble start address is less than the cursored line address (CLA). If so, the bubble length is added to the saved address at step 708. Following the path to completion, DAM would, at step 710, subtract the saved address from the cursored line address and place in the line vector table (74, FIG. 2). The corrected address returns control as shown at 714.

Referring again to the steps shown at 704 and 706, if the BBS is not greater than the SA and not less than the CLA then DAM takes step 720 to determine whether the BBS is less than the SA. If not, the steps shown at 710 through 714 are again taken. If the BBS is less than the saved address, then DAM determines at 722 whether the bubble start address is greater than the cursored line address. If this condition is not met, the path comprised of steps 710, 712, and 714 is taken and control is returned to the application program calling DAM. If, however, the bubble start address is greater than the cursored line address, DAM subtracts at 724 the bubble length from the SA and follows the path which begins with step 710. DAM subtracts the SA from the CLA and saves the corrected address in the LVT and returns control to the calling application program.

The address in the area called saved address (SA) may for example be the display screen top address (STA) which indicates the first location in the TSB relative to the TSB start which is displayed on the screen or it may be a tab rack address (TRA), pointers to tab rack image in the TSB which tell the display access method where tap stops are and this image may be changed throughout the document.

FIGS. 8–14 will be used in a discussion of the operation of the present invention during specific editing operations.

FIGS. 8–14 are similar to FIG. 3 in that in each there is a schematic representation of the screen, display 26, which corresponds with display refresh buffer 24, TSB 64, and diskette 21. Additionally, the edit point and other information such as bubble, TRA, STA and CLA locations are indicated.

Figure 8:
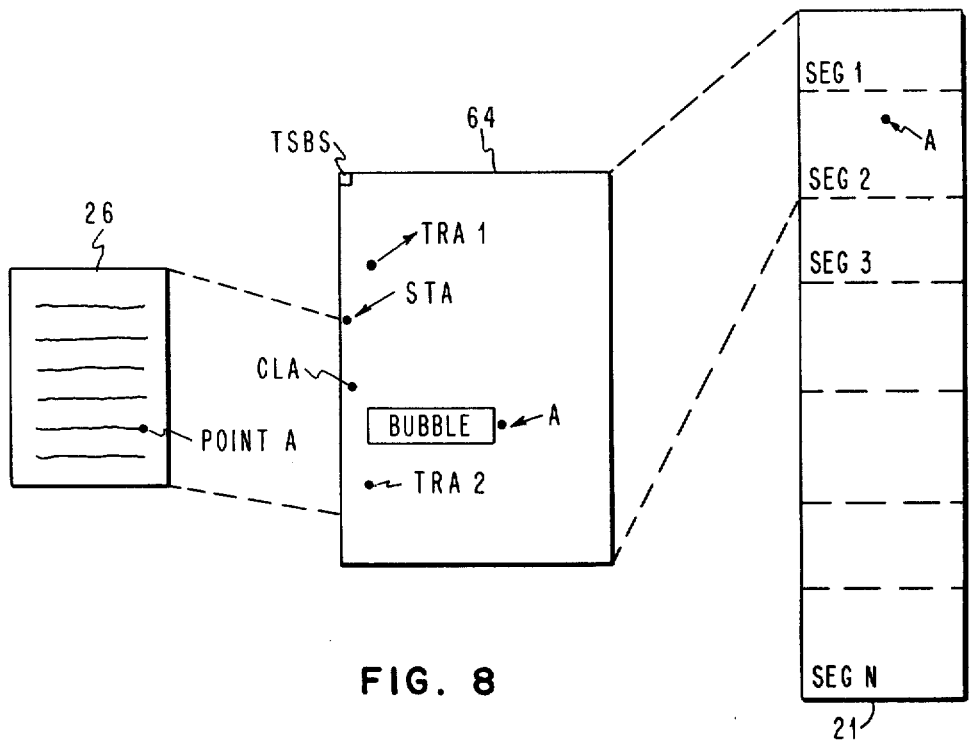
FIGS. 8-14 are illustrations of the impact of the present invention during a sequence of edit operations involving varying text locations in the system of FIG. 1.

In FIG. 8 the three storage locations are illustrated after a BUILD at a point in time when the operator of the text processing system wishes to edit the document shown segmentized on the diskette, at point A. All addresses are saved and converted before returning to the application program. The steps illustrated in FIG. 6 are utilized. It will be recalled that TSBS represents the starting location of the text storage buffer and STA is the screen top address. The cursored line address CLA is the address of the line which contains the edit point A which is shown to be after the bubble. TRA1 and TRA2 represent the tab rack addresses which are part of the text stream. We recall from the discussion of point formats that in text processing systems such as the one in which the present invention is embodied a tab rack is given for each line of text. The same tab rack may be employed throughout an entire document or it may change with every line. Tab racks are not stored in the LVT but within the text itself in the TSB. Within the finite length of an entry in the line vector table LVT, there is only a pointer to the more complete tab rack description in the TSB.

FIG. 8 also illustrates the point in time when DAM has been called to UPDATE the display when an operator wishes to insert or delete a character. This addition or deletion would occur at point A which would cause the bubble length to change. This illustrates why it was necessary in the routine of FIG. 6 to have both the old and new bubble lengths passed to DAM because it is the difference between those two lengths which must be considered in expressing an address relative to the cursored line address when updating the screen. When DAM is called to UPDATE it converts all of the addresses using a routine of FIG. 6 and before returning control to the application program uses the steps illustrated in FIG. 7 to convert the address to CLA relative.

Figure 9:
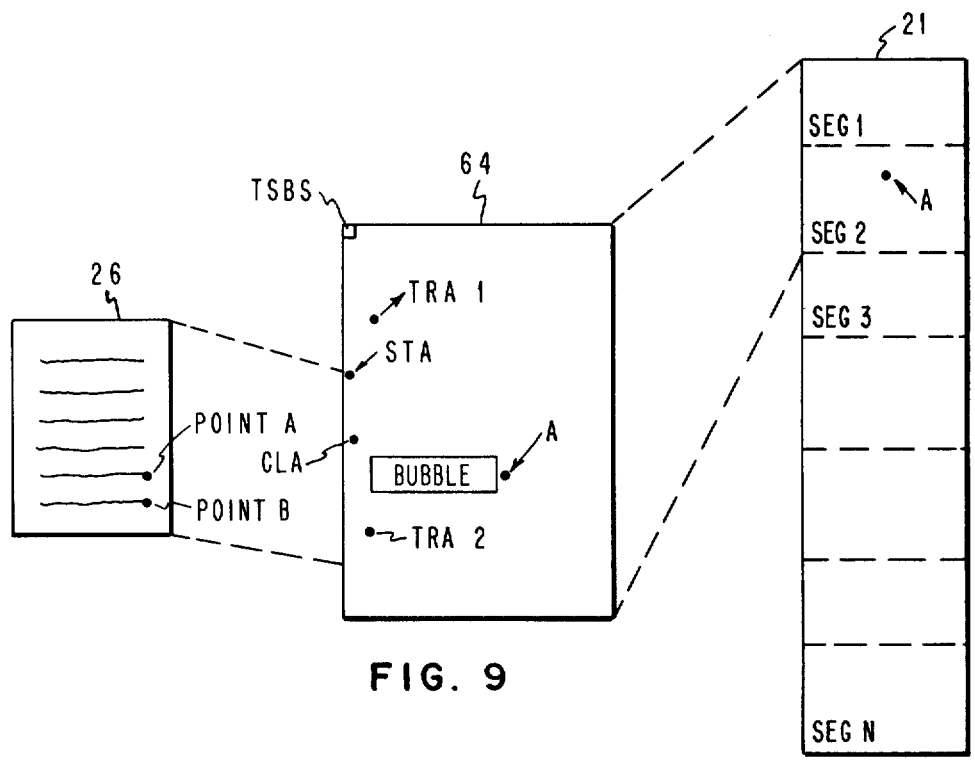
Figure 10:
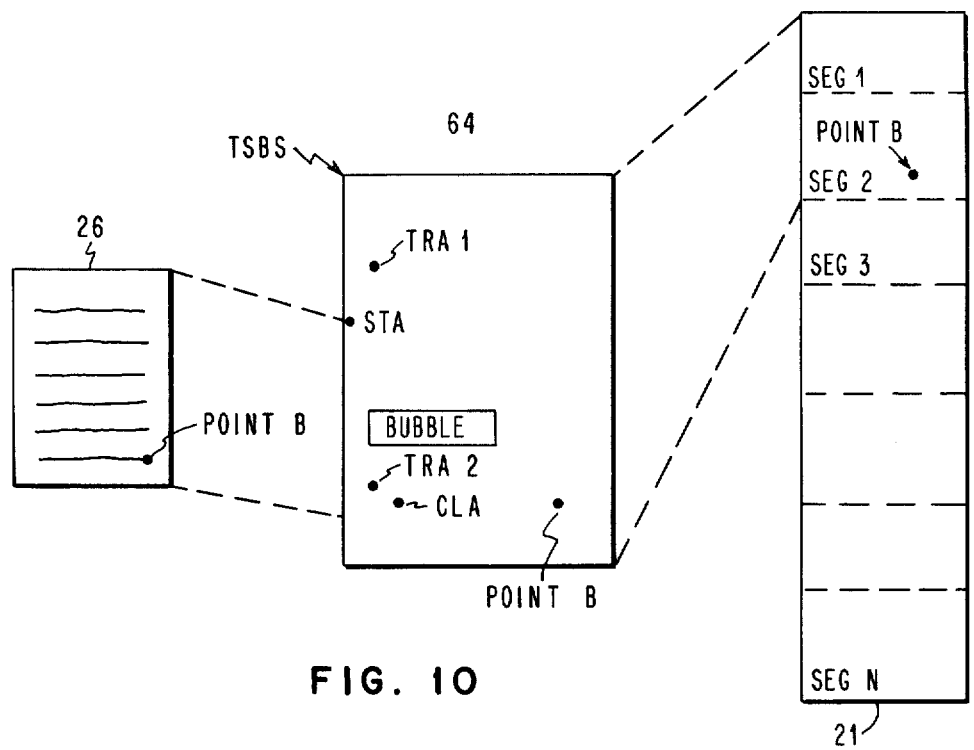
Figure 11:
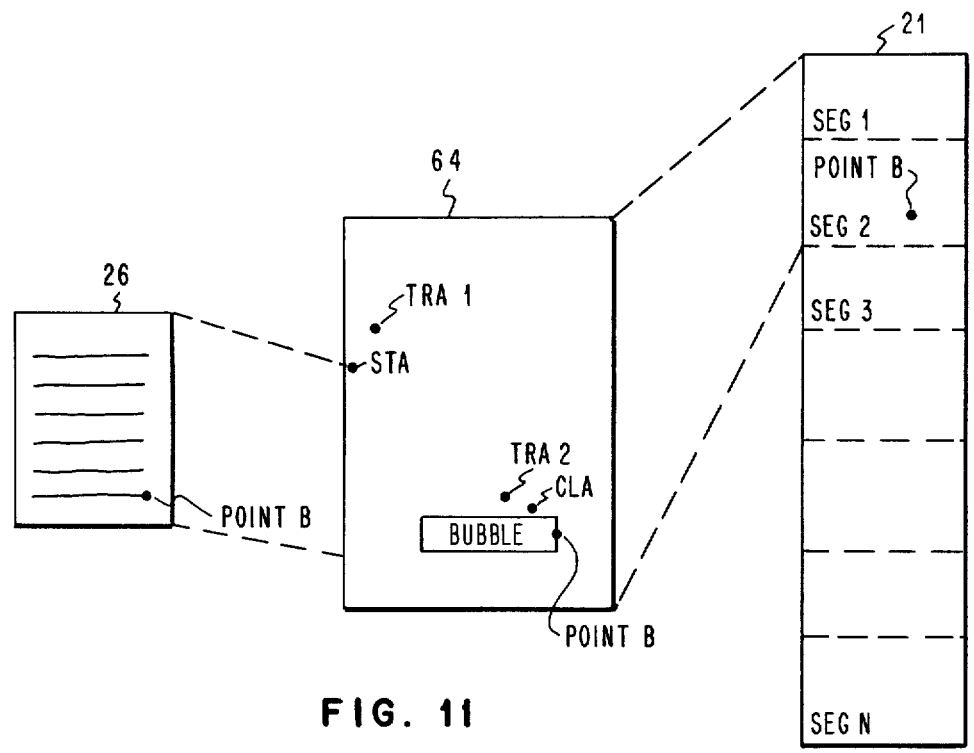

FIGS. 9, 10, and 11 should be considered together to illustrate the MOVE which causes the edit point to move from point A to point B on the CRT. The assumption for this example is that no previous changes have been made to the TSB. FIG. 10 shows the changes after the MOVE has been performed by DAM. The saved addresses are converted using the steps of FIG. 7. FIG. 11 illustrates the change in position of the bubble as a result of the MOVE of the edit point from point A to point B. As explained previously, this action changes the CLA which will be passed to DAM at the next call.

Figure 12:
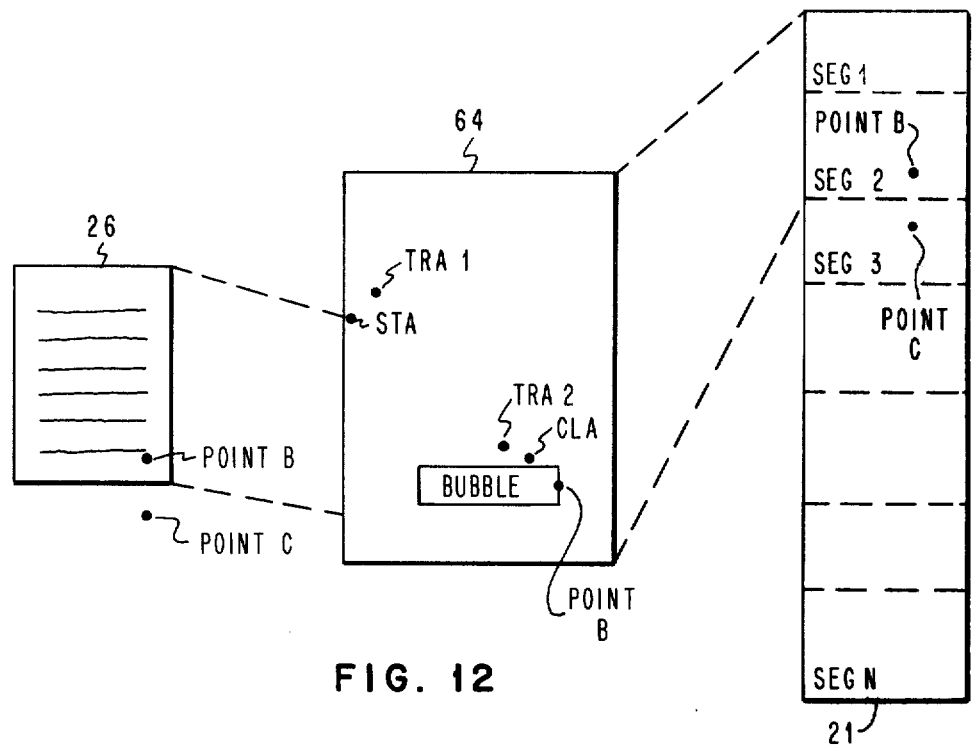
Figure 13:
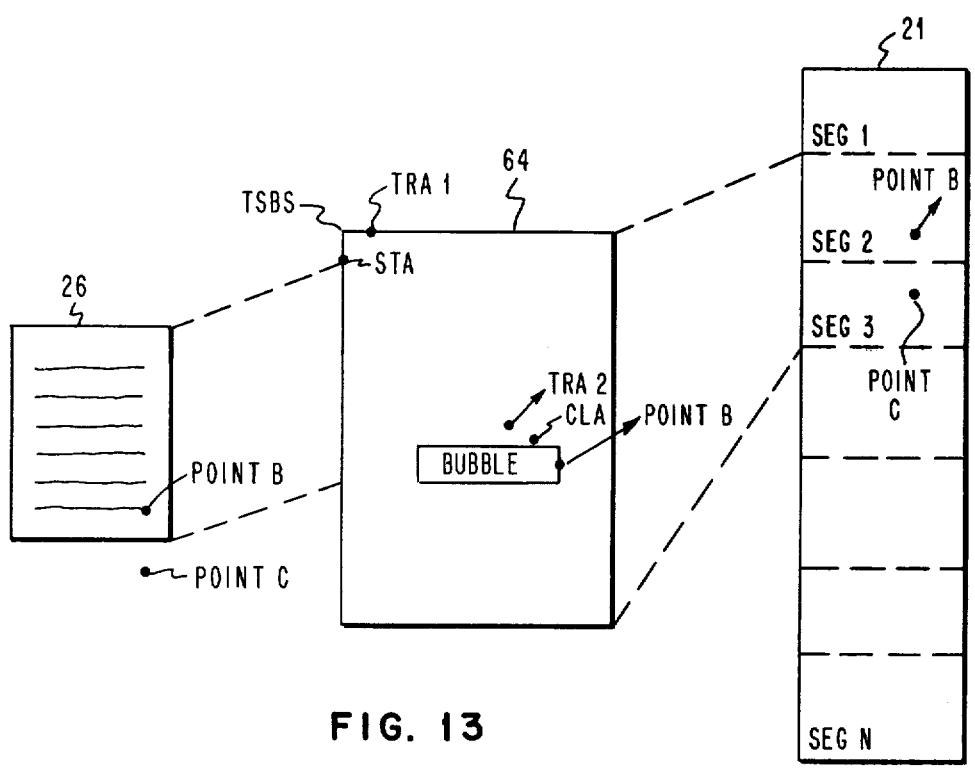
Figure 14:
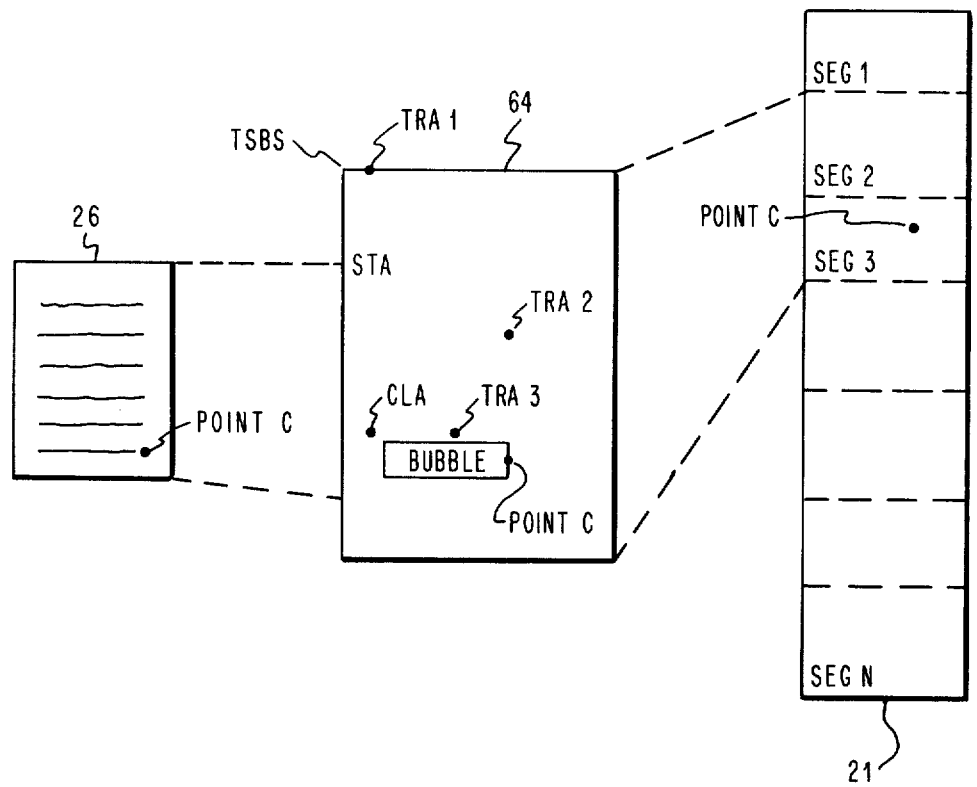

FIGS. 12, 13, and 14 should likewise be considered together. FIG. 12 illustrates relative position in the storage areas when the operator of the text processing system wishes to move the edit point to point C which is not within that small window of text in the refresh memory or in fact, contained in the TSB. FIG. 13 shows the results of a vertical scroll of the TSB upwardly in order to allow another segment from the diskette to be placed therein. It is to be noted particularly that the tab rack addresses as well as the screen start address and the cursored line address have moved. When DAM is called the new cursored line address is passed by the application program and all of the addresses are converted using the steps shown in FIG. 6. FIG. 14 illustrates the relative text positions after the DAM MOVE call. Edit point C is now in the refresh memory and, therefore, on the screen. One can see that it is in a different segment in FIGS. 14, 13, and 12 and all addresses will be converted following the process outlined in FIG. 7.

The particular series of edit operations just described highlights the dynamic nature of the location in the TSB of any given text entity in an interactive system such as the one in which the present invention is included.

Maintaining a single absolute address CLA with all others expressed relative thereto, enhances system performance by reducing the time required for response to operator requests which cause modifications to the screen contents.

The invention has been described with respect to a particular embodiment as implemented using a particular processor and display device. Obviously, the time saving performance improving concept of correlating text entity location in the TSB to the absolute address of the line containing the edit point may be applied to other systems having other and different size screen displays without departing from the scope of the present invention. We claim:

1. An interactive text processing system including connected random access and direct access storage, a keyboard, a display for displaying at least one line of cursored text, a display refresh memory, and a processor,
   wherein said random access storage includes a first area for holding an amount of a body of text of indeterminate length to be displayed;
   a second area having one entry corresponding to each line of text in the display refresh memory, each entry including format information and a pointer to the location in said first area holding the text to be displayed;
   said system further including means for circulating data between said first area in the random access storage and said direct access storage so that the absolute location of text in said first area changes; and
   means for expressing each entry in said second area relative to a known address in said first area.

2. The system of claim 1 wherein said known address is the starting point of a line in said first area containing the cursored text location.

3. The system of claims 1 or 2 wherein said first area also holds further format information and said entry in said second area additionally includes a pointer to said further format information in said first area.

4. In a word processing system including a display, a display refresh memory, and a dynamically changing text storage area for holding a portion of the complete text of indeterminate length a method of maintaining pointers between lines of text in said display refresh memory and locations in said dynamically changing text storage area including the stop of
   converting each pointer to an expression of relative displacement from a known address in said dynamically changing storage area.

5. The method of claim 4 including the steps of determining the size and location of a variable size area in said dynamically changing text storage area and
   factoring out the so determined size for the converting step.

6. An interactive text processing system including connected random access and direct access storage, a keyboard, a display, a display refresh memory, and a processor,
   wherein said random access storage includes
   a first area for holding a portion of text of indeterminate length to be processed and displayed; and
   a second area having one entry for each line of text in the refresh memory, each entry including format information and a pointer to the location in said first area containing the text to be displayed on that line;
   said first area including a variable size area at the edit point which area shrinks and expands as a result of edit operations; and
   means for circulating data between said first area and said direct access storage so that the absolute location of text in said first area changes; and
   means for assigning each pointer entry in said second area a relative displacement value from a known address in said first area.

7. The system of claim 6 wherein said known address in said first area is the starting address of the text line containing the edit point.

8. The system of claim 7 wherein said means for assigning also includes means for factoring out the size of the variable area in said first storage area.

9. The system of claim 8 wherein said first area also holds further format information and said entry in said second area additionally includes a pointer to said further format information in said first area.

10. The system of claims 6, 7, 8 or 9 wherein the means for assigning each pointer entry in said second area relative to a known address in said first area further comprises
    means for determining whether a display image is to be structured or modified;
    first means responsive to said determining means for initializing said second area pointers if a new display image is to be structured;
    second means responsive to said determining means for updating said third area pointers to reflect the modified display image.

11. The system of claim 10 wherein the means for assigning pointer contents in said second area in terms of relative displacement from the start of said first area comprises
    means for calculating the amount of size variation in the variable size area in said first area;
    means for determining where a given pointer points relative to said variable size area; and
    means for accounting for said variable size area in arriving at the relative displacement value.

* * * * *

UNITED STATES PATENT AND TRADEMARK OFFICE
CERTIFICATE OF CORRECTION

PATENT NO. : 4,425,629
DATED : January 10, 1984
INVENTOR(S) : W.C. Cason et al

It is certified that error appears in the above—identified patent and that said Letters Patent is hereby corrected as shown below:

Column 5, line 29 delete "random access memory" and insert --RAM--.

Column 12, line 4 delete "stop" and insert --step--.

Signed and Sealed this

Twelfth Day of June 1984

[SEAL]

Attest:

Attesting Officer

GERALD J. MOSSINGHOFF

Commissioner of Patents and Trademarks